United States Patent Office 3,257,427
Patented June 21, 1966

3,257,427
3-DESOXY-$\Delta^{1,3,5(10)}$-ESTRATRIENES AND PROCESSES FOR THE PREPARATION THEREOF
Albert Bowers and Otto Halpern, Mexico City, Mexico, assignors to Syntex Corporation, Panama, Panama, a corporation of Panama
No Drawing. Filed July 10, 1964, Ser. No. 381,919
Claims priority, application Mexico, June 4, 1963, 72,384
13 Claims. (Cl. 260—397.3)

This application is a continuation-in-part of our copending patent application Serial No. 301,999, filed August 14, 1963, now abandoned.

The present invention relates to certain novel cyclopentanoperhydrophenanthrene derivatives and to a method for the production thereof.

More particularly, it refers to a novel process for preparing 3-desoxy-$\Delta^{1,3,5(10)}$-estratriene steroids, and to the novel 3-desoxy-6-alkyl, alkenyl and alkinyl derivatives of estrone and estradiol, represented by the following formula:

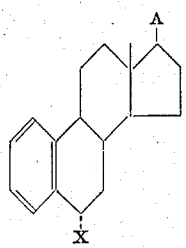

In the above formula, A represents a keto group or the grouping

R represents hydrogen or an acyl radical of less than 12 carbon atoms; $R^1$ represents hydrogen, a lower alkyl, alkenyl or alkinyl radical such as methyl, ethyl, propyl, isobutyl, vinyl, propenyl, ethinyl, propargyl, etc. and X represents lower alkyl, lower alkenyl or lower alkiny radicals of up to 6 carbon atoms.

The acyl groups are derived from hydrocarbon carboxylic acids containing less than 12 carbon atoms which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

These compounds are estrogenic type hormones showing anti-androgenic action and relatively low feminizing effect; they are especially useful in fertility control and treating menstrual disorders.

In accordance with the present invention the surprising discovery has been made that when a 3-hydroxy-$\Delta^{1(10),5}$-19-nor steroid of the androstane, pregnane or sapogenin series is treated with a dehydrating agent such as mineral acids, strong organic acids, phosphorous oxychloride, phosphorous pentachloride, thionyl chloride and the like, in a solvent inert to the reaction, dehydration and aromatization of ring A occurs, thus producing the 3-desoxy-$\Delta^{1,3,5(10)}$-estratrienes in accordance with the following equation wherein only rings A and B of the steroid molecule are represented:

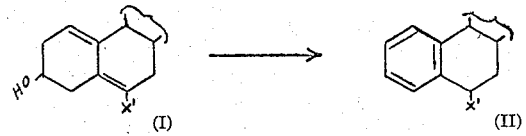

$X^1$ represents hydrogen or a lower aliphatic hydrocarbon radical, saturated or unsaturated of up to 6 carbon atoms.

The starting materials used for the process of the present invention are the 3-hydroxy-$\Delta^{1(10),5}$-19-nor-steroids of the androstane, pregnane or sapogenin series, or the corresponding 6-substituted derivatives, which are obtained by oxidation of the 3-acyloxy-19-hydroxy-$\Delta^5$-compounds with chromic acid in pyridine for a prolonged period of time, to produce the $\Delta^{5(10)}$-6-keto-3-acyloxy-19-nor compounds, which are reduced with lithium aluminum hydride or reacted with a Grignard reagent, followed by acid treatment of the 3,6-dihydroxy compounds or the 6-substituted derivatives, in accordance with our copending patent application Serial No. 293,898 filed July 9, 1963.

The starting materials may have a keto group at C-17 (androstane series), a 17β-acetyl radical (pregnane series) which may also have an acyloxy group at C-17α, the dihydroxyacetone side chain protected as the 17,20; 20,21-bismethylenedioxy derivative or the sapogenin side-chain. In addition, there may be present in the molecule of the starting material other groups which do not interfere in the reaction; thus, for example, when a 17β-acetyl radical is present, there may also be a double bond between C-16 and C-17, or a 16α,17α-diol, protected as the acetonide; a keto group at C-11, especially in the compounds possessing the dihydroxyacetone side chain at C-17; a methyl group at C-16α or C-16β, and the like.

Examples of such starting materials are:

$\Delta^{1(10),5}$-19-nor-androstadien-3β-ol-17-one,
6-methyl-$\Delta^{1(10),5}$-19-nor-androstadien-3β-ol-17-one,
6-ethyl-$\Delta^{1(10),5}$-19-nor-androstadien-3β-ol-17-one,
6-vinyl-$\Delta^{1(10),5}$-19-nor-androstadien-3β-ol-17-one,
6-ethinyl-$\Delta^{1(10),5}$-19-nor-androstadien-3β-ol-17-one,
$\Delta^{1(10),5}$-19-nor-pregnadien-3β-ol-20-one,
16α-methyl-$\Delta^{1(10),5}$-19-nor-pregnadien-3β-ol-20-one,
16α,17α-isopropylidenedioxy-$\Delta^{1(10),5}$-19-nor-pregnadien-3β-ol-20-one,
17-acetate of $\Delta^{1(10),5}$-19-nor-pregnadiene-3β,17α-diol-20-one,
17-acetate of 16α-methyl-$\Delta^{1(10),5}$-19-nor-pregnadiene-3β, 17α-diol-20-one,
17,20;20,21-bismethylenedioxy-$\Delta^{1(10),5}$-19-nor-pregnadiene-3β-ol,
17,20;20,21-bismethylenedioxy-$\Delta^{1(10),5}$-19-nor-pregnadiene-3β-ol-11-one,
6-methyl-17,20;20,21-bismethylenedioxy-$\Delta^{1(10),5}$-19-nor-pregnadien-3β-ol,
6-ethinyl-17,20;20,21-bismethylenedioxy-$\Delta^{1(10),5}$-19-nor-pregnadien-3β-ol and
$\Delta^{1(10),5}$-19-nor-22-isospirostadien-3β-ol.

In practicing the process illustrated above, a 3-hydroxy-$\Delta^{1(10),5}$-19-nor-steroid of the type hereinbefore indicated, (I), is treated with an excess of a dehydrating agent, in a solvent inert to the reaction, at a temperature between room and reflux temperature, for a priod of time of between 10 minutes and 24 hours, thus affording the respective $\Delta^{1,3,5(10)}$-3-desoxy-estratrienes (II). When the compounds are substituted at C-6, there are obtained mixtures of 6α and 6β-isomers, with the α-isomer predominating, which are purified preferably by chromatography on washed alumina or by fractional crystallization.

The dehydrating agents used in the process of the present invention are phosphorus oxychloride, phosphorus pentachloride, thionyl chloride, mineral acids and strong organic acids such as hydrochloric acid, hydrobromic acid, sulfuric acid, p-toluenesulfonic acid, etc.

The dehydration with phosphorus oxychloride or phosphorus pentachloride is effected using aromatic hydrocarbons and ethers as solvents such as for example benzene, toluene, xylene, carbon tetrachloride, diethyl ether, isopropyl ether, tetrahydrofuran, dioxane, etc. The best results are obtained by using benzene as solvent, at reflux temperature for approximately 1 hour.

Thionyl chloride is used in pyridine solution and at low temperature, i.e. between 0 and 20° C., for a period of time of between 6 and 24 hours.

The mineral acids are used preferably in the form of a dilute aqueous solution, which is added to a solution of the steroid in an inert solvent miscible with water, such as for example dioxane, tetrahydrofuran, acetone, etc., refluxing the reaction mixture for approximately 12 to 24 hours. Best results are obtained by using a 1% aqueous hydrochloric acid solution, in dioxane as solvent, at reflux temperature for 24 hours. A 1 N solution of anhydrous hydrogen chloride in glacial acetic acid is also practical, in this case the reaction is conducted at approximately room temperature for a period of time in the order of 4 to 6 hours.

In order to obtain $\Delta^{1,3,5(10)}$-estratrien-17-one, $\Delta^{1,3,5(10)}$-estratrien-17$\beta$-ol and the novel 17$\alpha$- and/or 6$\alpha$-alkyl, alkenyl or alkinyl substituted derivatives, we follow the method illustrated by the following reaction sequence:

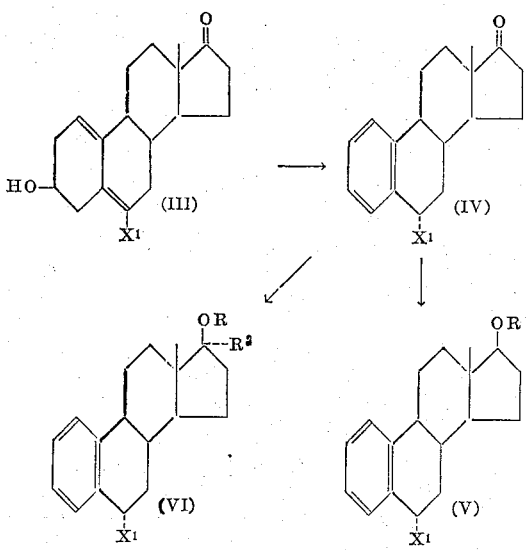

In the preceding formulas R and $X^1$ have the same meaning as heretofore indicated; $R^2$ represents a lower alkyl, alkenyl or alkinyl radical.

In practicing the process illustrated above, $\Delta^{1(10),5}$-estradien-3$\beta$-ol-17-one or the 6-alkyl, alkenyl or alkinyl substituted derivatives (III), are reacted with a mineral acid, a strong organic acid, phosphorus oxychloride, phosphorus pentachloride or thionyl chloride in an organic solvent inert to the reaction, as described in detail hereinbefore, to produce $\Delta^{1,3,5(10)}$-estratrien-17-one or its 6-substituted derivatives (IV). In the latter case there are obtained mixtures of 6$\alpha$ and 6$\beta$ isomers, with the $\alpha$-isomer predominating, which are purified by conventional methods, such as chromatography or fractional crystallization.

Reduction of IV with a double metal hydride such as lithium aluminum hydride in tetrahydrofuran solution or sodium borohydride, preferably in aqueous methanol solution affords $\Delta^{1,3,5(10)}$-estratrien-17$\beta$-ol and its 6$\alpha$-substituted derivatives (V; R=H), which are converted into the respective esters (V; R=acyl) by reaction with acid anhydrides or acid chlorides of less than 12 carbon atoms in pyridine solution, in a conventional manner.

By reacting the $\Delta^{1,3,5(10)}$-17-keto-estratrienes (IV) with an alkyl, alkenyl or alkinyl magnesium halide such as methyl, ethyl, vinyl, ethinyl or propargyl magnesium bromide, at reflux temperature, and preferably in a mixture of ether-benzene, there are obtained the corresponding 17$\alpha$-substituted derivatives (VI; R=H). The introduction of the hydrocarbon substituent at C-17$\alpha$ may also be effected by using an alkyl lithium or the sodium or potassium salt of a lower alkine.

By treatment of these compounds with a carboxylic acid anhydride of less than 12 carbons in benzene solution and in the presence of p-toluenesulfonic acid, there are obtained the corresponding esters (VI; R=acyl).

The following specific examples serve to illustrate but are not intended to limit the scope of the present invention:

*Example I*

A solution of 2 g. of $\Delta^{1(10),5}$-19-nor-androstadien-3$\beta$-ol-17-one in 200 cc. of anhydrous benzene and 20 cc. of phosphorus oxychloride was refluxed for 1.5 hours under anhydrous conditions; the solution was cooled and carefully poured onto saturated sodium bicarbonate solution, the organic layer was separated and washed with water to neutral, dried over anhydrous sodium sulfate and evaporated to dryness under reduced pressure. The residue was crystallized from acetone-hexane, to produce $\Delta^{1,3,5(10)}$-estratrien-17-one (3-desoxy-estrone), identical to an authentic sample.

*Example II*

The preceding example was repeated but the reaction mixture was allowed to stand for 24 hours at room temperature, to produce also 3-desoxy estrone in similar yield.

*Example III*

In the method of Example I, toluene was used as solvent instead of benzene, with the same results.

*Example IV*

5 g. of $\Delta^{1(10),5}$-19-nor-androstadien-3$\beta$-ol-17-one were treated in accordance with the method of Example I, but substituting benzene by carbon tetrachloride, to produce the same product as in said example.

*Example V*

To a solution of 2 g. of 3-desoxy-estrone in 100 cc. of methanol there was added 1 g. of sodium borohydride dissolved in 4 cc. of water. The reaction mixture was kept at room temperature overnight, the excess reagent was decomposed by adding acetic acid and the resulting solution concentrated under vacuo to a small volume and diluted with water. The product was extracted with ethyl acetate and the extract washed with water, dried and evaporated to dryness. Crystallization of the residue from acetone-hexane gave $\Delta^{1,3,5(10)}$-estratrien-17$\beta$-ol.

*Example VI*

A solution of 1 g. of $\Delta^{1(10),5}$-19-nor-androstadien-3$\beta$-ol-17-one in 7 cc. of anhydrous pyridine was cooled to 0° C. and treated with 1 cc. of thionyl chloride, and the reaction mixture was kept at room temperature overnight. Ice water was added and the product extracted with methylene chloride. The organic extract was washed with dilute hydrochloric acid, water, sodium bicarbonate solution, and water to neutral, dried over anhydrous sodium sulfate and evaporated to dryness. The residue was purified by chromatography on washed alumina, to afford $\Delta^{1,3,5(10)}$-estratrien-17-one, identical to the obtained by the preceding methods.

*Example VII*

In the method of Example I, the benzene was substituted by dioxane, to produce also 3-desoxy-estrone in similar yield.

Example VIII

A solution of 2 g. of $\Delta^{1(10),5}$-19-nor-androstadien-3β-ol-17-one in 150 cc. of ether and 25 cc. of phosphorus oxychloride was refluxed for 6 hours under anhydrous conditions, cooled and washed with a saturated sodium bicarbonate solution and water to neutral, dried and evaporated to dryness. Crystallization of the residue from acetone-hexane gave 3-desoxy-estrone, identical to that obtained in the preceding examples.

Example IX

A solution of 1 g. of 3-desoxy-estrone in 100 cc. of thiophene-free benzene was treated with 12 cc. of 4 N methylmagnesium bromide in ether and the mixture refluxed with the exclusion of moisture for 3 hours. The cooled mixture was cautiously treated with an excess of aqueous ammonium chloride solution and the product isolated by ethyl acetate extraction. The extract was washed with water, dried over anhydrous sodium sulfate and evaporated to dryness. Recrystallization from methylene chloride-hexane gave 17α-methyl-$\Delta^{1,3,5(10)}$-estratrien-17β-ol.

In a similar manner but using ethyl, propyl, vinyl, ethinyl and propargyl magnesium bromide, instead of methyl magnesium bromide, there were obtained 17α-ethyl-$\Delta^{1,3,5(10)}$-estratrien-17β-ol,
17α-propyl-$\Delta^{1,3,5(10)}$-estratrien-17β-ol,
17α-vinyl-$\Delta^{1,3,5(10)}$-estratrien-17β-ol,
17α-ethinyl-$\Delta^{1,3,5(10)}$-estratrien-17β-ol and
17α-propargyl-$\Delta^{1,3,5(10)}$-estratrien-17β-ol.

Example X

In accordance with the method described in Example III, 5 g. of 6-methyl-$\Delta^{1(10),5}$-19-nor-androstadien-3β-ol-17-one were treated with phosphorus oxychloride in toluene solution; the product was purified by chromatography on washed alumina, thus producing 6α-methyl-$\Delta^{1,3,5(10)}$-estratrien-17-one.

The preceding compound was treated with methyl, ethyl and vinyl magnesium bromide, by following the method described in the preceding example, to produce respectively 6α,17α-dimethyl-$\Delta^{1,3,5(10)}$-estratrien-17β-ol,
6α-methyl-17α-ethyl-$\Delta^{1,3,5(10)}$-estratrien-17β-ol and
6α-methyl-17α-vinyl-$\Delta^{1,3,5(10)}$-estratrien-17β-ol.

Example XI

In accordance with the method described in Example I, the compounds below mentioned (I) were treated with phosphorus oxychloride in benzene solution, to produce the respective $\Delta^{1,3,5(10)}$-estratrien-derivatives (II) which were purified by chromatography on washed alumina.

| I | II |
|---|---|
| 6-ethinyl-$\Delta^{1(10),5}$-19-nor-androstadien-3β-ol-17-one. | 6α-ethinyl-$\Delta^{1,3,5(10)}$-estratrien-17-one. |
| 6-ethyl-$\Delta^{1(10),5}$-19-nor-androstadien-3β-ol-17-one. | 6-ethyl-$\Delta^{1,3,5(10)}$-estratrien-17-one. |
| 6-vinyl-$\Delta^{1(10),5}$-19-nor-androstadien-3β-ol-17-one. | 6α-vinyl-$\Delta^{1,3,5(10)}$-estratrien-17-one. |
| 6-propargyl-$\Delta^{1(10),5}$-19-nor-androstadien-3β-ol-17-one. | 6α-propargyl-$\Delta^{1,3,5(10)}$-estratrien-17-one. |
| $\Delta^{1(10),5}$-19-nor-pregnadien-3β-ol-20-one. | $\Delta^{1,3,5(10)}$-19-nor-pregnatrien-20-one. |
| 17,20;20,21-bismethylenedioxy-$\Delta^{1(10),5}$-19-nor-pregnadien-3β-ol. | 17,20;20,21-bismethylene-dioxy-$\Delta^{1,3,5(10)}$-19-nor-pregnatriene. |

Example XII

A solution of 1 g. of 6α-methyl-$\Delta^{1,3,5(10)}$-estratrien-17-one in 50 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 50 g. of neutral alumina gave 6α-methyl-17α-ethinyl-$\Delta^{1,3,5(10)}$-estratrien-17β-ol.

Example XIII

By following the method described in Example V, the compounds listed under I were reduced with sodium borohydride, thus producing the compounds under II:

| I | II |
|---|---|
| 6α-methyl-$\Delta^{1,3,5(10)}$-estratrien-17-one. | 6α-methyl-$\Delta^{1,3,5(10)}$-estratrien-17β-ol. |
| 6α-ethyl-$\Delta^{1,3,5(10)}$-estratrien-17-one. | 6α-ethyl-$\Delta^{1,3,5(10)}$-estratrien-17β-ol. |
| 6α-vinyl-$\Delta^{1,3,5(10)}$-estratrien-17-one. | 6α-vinyl-$\Delta^{1,3,5(10)}$-estratrien-17β-ol. |
| 6α-ethinyl-$\Delta^{1,3,5(10)}$-estratrien-17-one. | 6α-ethinyl-$\Delta^{1,3,5(10)}$-estratrien-17β-ol. |
| 6α-propargyl-$\Delta^{1,3,5(10)}$-estratrien-17-one. | 6α-propargyl-$\Delta^{1,3,5(10)}$-estratrien-17β-ol. |

Example XIV

A mixture of 1 g. of $\Delta^{1,3,5(10)}$-estratrien-17β-ol, 4 cc. of pyridine and 4 cc. of acetic anhydride was allowed to stand at room temperature overnight, poured into water and the formed precipitate collected by filtration; crystallization from acetone-ether gave the acetate of $\Delta^{1,3,5(10)}$-estratrien-17β-ol.

By the same method, 6α-methyl-$\Delta^{1,3,5(10)}$-estratrien-17β-ol, 6α-vinyl-$\Delta^{1,3,5(10)}$-estratrien-17β-ol, and 6α-ethinyl-$\Delta^{1,3,5(10)}$-estratrien-17β-ol were converted into the respective acetates.

Example XV

In accordance with the method described in Example IX, the compounds below mentioned (I) were treated with the indicated Grignard reagent, to produce the respective 17α-substituted derivatives (II):

| I | Reagent | II |
|---|---|---|
| 6α-ethyl-$\Delta^{1,3,5(10)}$-estratrien-17-one. | Methylmagnesium bromide. | 6α-ethyl-17α-methyl-$\Delta^{1,3,5(10)}$-estratrien-17β-ol. |
| 6α-vinyl-$\Delta^{1,3,5(10)}$-estratrien-17-one. | Ethylmagnesium bromide. | 6α-vinyl-17α-ethyl-$\Delta^{1,3,5(10)}$-estratrien-17β-ol. |
| 6α-ethinyl-$\Delta^{1,3,5(10)}$-estratrien-17-one. | Methylmagnesium bromide. | 6α-ethinyl-17α-methyl-$\Delta^{1,3,5(10)}$-estratrien-17β-ol. |
| 6α-ethinyl-$\Delta^{1,3,5(10)}$-estratrien-17-one. | Vinylmagnesium bromide. | 6α-ethinyl-17α-vinyl-$\Delta^{1,3,5(10)}$-estratrien-17β-ol. |
| 6α-propargyl-$\Delta^{1,3,5(10)}$-estratrien-17-one. | Propylmagnesium bromide. | 6α-propargyl-17α-propyl-$\Delta^{1,3,5(10)}$-estratrien-17β-ol. |

Example XVI

To a solution of 1 g. of 17α-methyl-$\Delta^{1,3,5(10)}$-estratrien-17β-ol in 40 cc. of anhydrous benzene there were added 200 mg. of p-toluenesulfonic acid and 4 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the acetate of 17α-methyl-$\Delta^{1,3,5(10)}$-estratrien-17β-ol.

Example XVII

In accordance with the method described in the preceding example, but using propionic, caproic and enanthic anhydride as esterifying agents, there were obtained the propionate, caproate and enanthate of 17α-methyl- $\Delta^{1,3,5(10)}$-estratrien-17β-ol and 6α,17α-dimethyl-$\Delta^{1,3,5(10)}$-estratrien-17β-ol.

Example XVIII

Example XII was repeated but using as starting material 6α-ethinyl-$\Delta^{1,3,5(10)}$-estratrien-17-one to produce 6α,17α-diethinyl-$\Delta^{1,3,5(10)}$-estratrien-17β-ol.

The foregoing compound was esterified with acetic anhydride in benzene solution and in the presence of p-toluenesulfonic acid, by following the method described in Example XVI, thus producing the acetate of 6α,17α-diethinyl-$\Delta^{1,3,5(10)}$-estratrien-17β-ol.

Example XIX

In accordance with the method described in Example XVI, the compounds below mentioned (I) were esterified with the indicated acid anhydride, to produce the corresponding esters (II):

| I | Anhydride | II |
|---|---|---|
| 6α-ethyl-17α-methyl-$\Delta^{1,3,5(10)}$-estratrien-17β-ol. | Propionic | Propionate of 6α-ethyl-17α-methyl-$\Delta^{1,3,5(10)}$-estratrien-17β-ol. |
| 6α-vinyl-17α-ethyl-$\Delta^{1,3,5(10)}$-estratrien-17β-ol. | Caproic | Caproate of 6α-vinyl-17α-ethyl-$\Delta^{1,3,5(10)}$-estratrien-17β-ol. |
| 6α-ethinyl-17α-methyl-$\Delta^{1,3,5(10)}$-estratrien-17β-ol. | Enanthic | Enanthate of 6α-ethinyl-17α-methyl-$\Delta^{1,3,5(10)}$-estratrien-17β-ol. |
| 6α-ethinyl-17α-vinyl-$\Delta^{1,3,5(10)}$-estratrien-17β-ol. | Acetic | Acetate of 6α-ethinyl-17α-vinyl-$\Delta^{1,3,5(10)}$-estratrien-17β-ol. |
| 6α-propargyl-17α-propyl-$\Delta^{1,3,5(10)}$-estratrien-17β-ol. | Cyclopentylpropionic. | Cyclopentylpropionate of 6α-propargyl-17α-propyl-$\Delta^{1,3,5(10)}$-estratrien-17β-ol. |

Example XX

A solution of 2 g. of $\Delta^{1(10),5}$-19-nor-pregnadiene-3β,17α-diol-20-one in 250 cc. of anhydrous benzene was treated with 20 cc. of phosphorus oxychloride and the mixture was heated at reflux temperature for 10 minutes; it was then poured into ice water and sodium bicarbonate solution was added. The organic layer was separated and washed with water to neutral, dried and evaporated to dryness. The residue was chromatographed on washed alumina to produce $\Delta^{1,3,5(10)}$-19-nor-pregnatrien-17α-ol-20-one.

Example XXI

By following the method described in Example VIII, 5 g. of $\Delta^{1(10),5}$-19-nor-22-isospirostadien-3β-ol were converted into $\Delta^{1,3,5(10)}$-19-nor-22-isospirostatriene.

Example XXII

Example II was repeated but using as starting material 17,20;20,21 - bismethylenedioxy - $\Delta^{1(10),5}$ - 19 - nor - pregnadien - 3β - ol - 11 - one. There was thus obtained 17,20;20,21 - bismethylenedioxy - $\Delta^{1,3,5(10)}$ - 19 - nor - pregnatrien-11-one.

A mixture of 1 g. of the foregoing compound and 20 cc. of 60% formic acid was heated on the steam bath for 1 hour, cooled, diluted with water, the formed precipitate collected by filtration and dried under vacuo. Crystallization from acetone-ether gave $\Delta^{1,3,5(10)}$-19-nor-pregnatriene-17α,21-diol-11,20-dione in pure form.

Example XXIII

A solution of 5 g. of $\Delta^{1(10),5}$-19-nor-androstadien-3β-ol-17-one in 75 cc. of dioxane was treated with 2.5 cc. of concentrated hydrochloric acid and the reaction mixture was refluxed for 24 hours. It was then neutralized with sodium carbonate solution and concentrated to a small volume, under vacuo. Water was added and the formed precipitate collected by filtration, washed with water and air dried. Crystallization from acetone-hexane gave the pure $\Delta^{1,3,5(10)}$-estratrien-17-one, identical to an authentic sample.

Example XXIV

In the method of the preceding example there was used a saturated aqueous solution of hydrogen bromide instead of hydrochloric acid with the same results.

Example XXV

A solution of 1 g. of $\Delta^{1(10),5}$-19-nor-androstadiene-3β-ol-17-one in 50 cc. of tetrahydrofuran was treated with 0.5 cc. of a 1% aqueous sulfuric acid solution and the mixture refluxed for 20 hours. By following the isolation technique of Example XXIII there was also obtained $\Delta^{1,3,5(10)}$-estratrien-17-one.

Example XXVI

In the method of Example XXIII there was used 500 mg. of p-toluenesulfonic acid instead of concentrated hydrochloric acid. Similar results were obtained.

We claim:
1. A compound of the following formula:

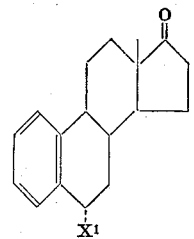

wherein $X^1$ represents a lower alkenyl group.

2. A compound of the following formula:

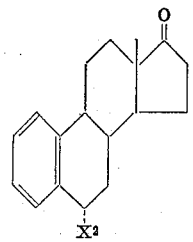

wherein $X^2$ represents a lower alkinyl group.

3. 6α-vinyl-$\Delta^{1,3,5(10)}$-estratrien-17-one.
4. 6α-ethinyl-$\Delta^{1,3,5(10)}$-estratrien-17-one.
5. A compound of the following formula:

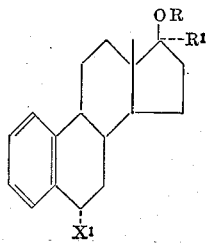

wherein R is selected from the group consisting of hydrogen and a hydrocarbon carboxylic acyl radical of less than 12 carbon atoms, $R^1$ is selected from the group consisting of hydrogen, a lower alkyl, a lower alkenyl and a lower alkinyl group, and $X^1$ represents a lower alkenyl group.

6. A compound of the following formula:

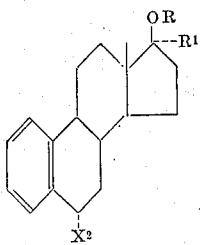

wherein R is selected from the group consisting of hydrogen and a hydrocarbon carboxylic acyl radical of less than 12 carbon atoms, $R^1$ is selected from the group consisting of hydrogen, a lower alkyl, a lower alkenyl and a lower alkinyl group, and $X^2$ represents a lower alkinyl group.

7. 6α-vinyl-$\Delta^{1,3,5(10)}$-estratrien-17β-ol.

8. 6α-ethinyl-$\Delta^{1,3,5(10)}$-estratrien-17β-ol.

9. A process for producing 3-desoxy-$\Delta^{1,3,5(10)}$-steroids which comprises treating a 3-hydroxy-$\Delta^{1(10),5}$-19-nor steroid selected from the group consisting of the androstane, pregnane and spirostane series with a dehydrating agent selected from the group consisting of mineral acids, strong organic acids, phosphorus oxychloride, phosphorus pentachloride and thionylchloride in an inert organic solvent, at a temperature of between 0° C. and reflux temperature and for a period of time between 10 minutes and 24 hours.

10. The process of claim 9 wherein the dehydrating agent is hydrochloric acid and the inert solvent is dioxane.

11. The process of claim 9 wherein the dehydrating agent is sulfuric acid and the inert solvent is tetrahydrofuran.

12. The process of claim 9 wherein the dehydrating agent is phosphorus oxychloride and the inert solvent is benzene.

13. The process of claim 9 wherein the dehydrating agent is thionyl chloride and the inert solvent is pyridine.

References Cited by the Examiner
UNITED STATES PATENTS

| | | | |
|---|---|---|---|
| 2,946,785 | 7/1960 | Johns et al. | 260—239.55 |
| 2,947,763 | 8/1960 | Goldkamp | 260—397.3 |
| 3,080,399 | 3/1963 | Ringold et al. | 260—397.5 |
| 3,081,316 | 3/1963 | Sakakibara et al. | 260—397.3 |

LEWIS GOTTS, *Primary Examiner.*

JOHNNIE R. BROWN, *Assistant Examiner.*